(12) United States Patent  
Kawanishi et al.

(10) Patent No.: US 7,572,986 B2  
(45) Date of Patent: Aug. 11, 2009

(54) COMBINATION WEIGHER

(75) Inventors: Shozo Kawanishi, 7-39, Kurakuen yonban-cho, Nishinomiya-shi, Hyogo 662-0088 (JP); Hiroshi Higuchi, Takasago (JP); Taketoshi Okamura, Ashiya (JP)

(73) Assignee: Shozo Kawanishi, Nishinomiya-shi (JP)

( * ) Notice: Subject to any disclaimer, the term of this patent is extended or adjusted under 35 U.S.C. 154(b) by 0 days.

(21) Appl. No.: 11/720,063

(22) PCT Filed: Nov. 10, 2005

(86) PCT No.: PCT/JP2005/050262

§ 371 (c)(1),  
(2), (4) Date: Mar. 26, 2008

(87) PCT Pub. No.: WO2006/057164

PCT Pub. Date: Jun. 1, 2006

(65) Prior Publication Data

US 2008/0245578 A1 Oct. 9, 2008

(30) Foreign Application Priority Data

Nov. 25, 2004 (JP) ............................. 2004-339965

(51) Int. Cl.  
*G01G 19/387* (2006.01)

(52) U.S. Cl. .................................. 177/25.18

(58) Field of Classification Search .............. 177/25.18  
See application file for complete search history.

(56) References Cited

U.S. PATENT DOCUMENTS 4,358,693 A * 11/1982 Palmer et al. .................. 310/46

(Continued)

FOREIGN PATENT DOCUMENTS

JP 63-65322 3/1988

(Continued)

OTHER PUBLICATIONS

International Search Report for PCT/JP2005/020562, dated Nov. 30, 2005.

*Primary Examiner*—Randy W Gibson  
(74) *Attorney, Agent, or Firm*—Marshall, Gerstein & Borun LLP

(57) ABSTRACT

A combination weigher of the present invention comprises a center base body (9), a plurality of feeding hoppers (3), a plurality of weighing hoppers (4) each including two weighing chambers (4a, 4b), a plurality of memory hoppers (5) each including two accommodating chambers (5a, 5b), a collecting chute (7) configured to receive objects to be weighed discharged from the weighing chamber and the accommodating chamber and to discharge the objects to be weighed, and a control unit (10) configured to perform combination calculation based on measured values of the objects to be weighed inside the weighing chambers of each weighing hopper (4) and measured values of the objects to be weighed inside the accommodating chambers of each memory hopper (5) to select a combination of weighing chambers and/or accommodating chambers which will discharge the objects to be weighed, and to cause the selected chambers to discharge the objects to be weighed onto the collecting chute (7), the two weighing chambers of each weighing hopper (4) are arranged along a side surface of the center base body (9) and the accommodating chambers of each memory hopper (5) are arranged along the side surface of the center base body (9).

5 Claims, 4 Drawing Sheets

U.S. PATENT DOCUMENTS

| | | | |
|---|---|---|---|
| 4,446,938 A * | 5/1984 | Kawanishi | 177/25.18 |
| 4,560,015 A * | 12/1985 | Minamida | 177/25.18 |
| 4,616,722 A * | 10/1986 | Moran | 177/99 |
| 4,825,896 A * | 5/1989 | Mikata | 177/25.18 |
| 4,840,240 A * | 6/1989 | Toyoda et al. | 177/25.18 |
| 4,844,190 A * | 7/1989 | Mikami et al. | 177/25.18 |
| 4,854,924 A * | 8/1989 | Nagano | 474/140 |
| 4,901,807 A * | 2/1990 | Muskat et al. | 177/25.18 |
| 4,967,856 A * | 11/1990 | Kawanishi et al. | 177/25.18 |
| 5,048,623 A * | 9/1991 | Toyoda | 177/25.18 |
| 5,258,581 A * | 11/1993 | Pearce et al. | 177/25.18 |
| 7,312,408 B2 * | 12/2007 | Kawanishi et al. | 177/25.18 |
| 2008/0190671 A1 * | 8/2008 | Higuchi et al. | 177/25.11 |
| 2008/0302580 A1 * | 12/2008 | Kawanishi et al. | 177/25.18 |

FOREIGN PATENT DOCUMENTS

JP  04-118528 A  4/1992

* cited by examiner

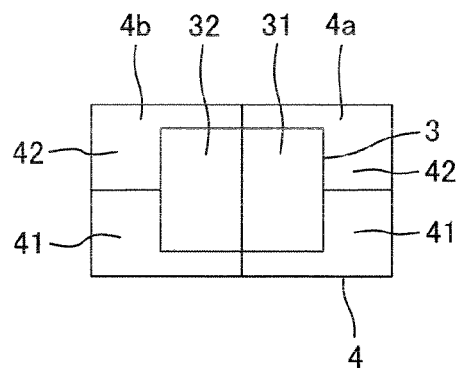
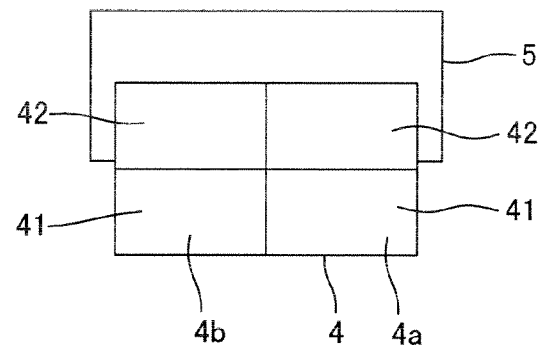
FIG. 3(a)  FIG. 3(b)
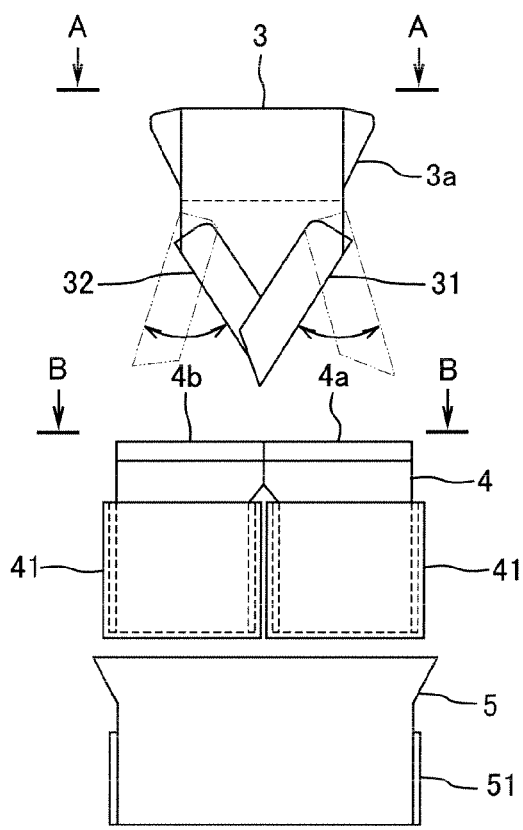
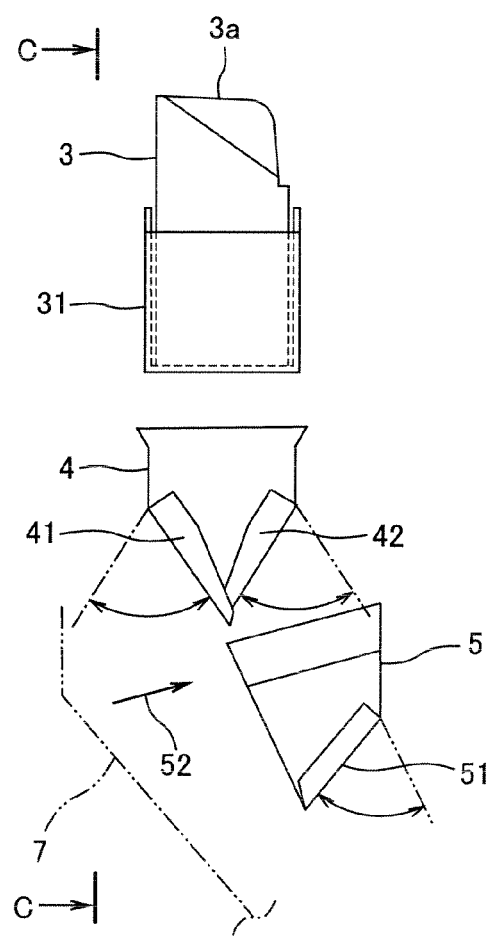
FIG. 3(c)  FIG. 3(d)

COMBINATION WEIGHER

TECHNICAL FIELD

The present invention relates to a combination weigher comprising a plurality of weighing hoppers each including two weighing chambers.

BACKGROUND ART

One example of a conventional combination weigher which weighs objects to be weighed, such as detergents and confectionary, and comprises weighing hoppers each including two chambers (weighing chambers), is disclosed in, for example, a patent document 1. A schematic construction of the conventional combination weigher is shown in FIG. 4.

The conventional combination weigher is constructed in such a manner that a center base body (body) 69 is disposed at a center of the combination weigher, and a dispersion feeder 61 is mounted to an upper portion of the center base body 69 to radially disperse objects to be weighed supplied from an external supplying device by vibration. Around the dispersion feeder 61, linear feeders 62 are provided to transfer the objects to be weighed sent from the dispersion feeder 61 into respective feeding hoppers 63 by vibration. A plurality of feeding hoppers 63, weighing hoppers 64, and memory hoppers 65 are disposed below the linear feeders 62 and are arranged circularly around the center base body 69 in such a manner that each feeding hopper 63, each weighing hopper 64, and each memory hopper 65 correspond to the associated one of the linear feeder 62. The dispersion feeder 61, the linear feeders 62, the feeding hoppers 63, the weighing hoppers 64, and the memory hoppers 65 are mounted to the center base body 69, and drive units therefore are accommodated in the center base body 69. Each weighing hopper 64 is attached with a weight sensor 66 which measures the weight of the objects to be weighed inside the weighing hopper 64. Each weight sensor 66 is accommodated along with the drive units in the center base body 69. A collecting chute 67 is disposed laterally of and below the weighing hoppers 64 and the memory hoppers 65. The objects to be weighed are discharged from the weighing hoppers 64 and the memory hoppers 65 which have been selected to form a combination, slide down on the collecting chute 67, and are sent out to a packaging machine through an outlet provided at the collecting chute 67.

Each feeding hopper 63 is divided into two chambers 63a and 63b, each of which is provided with a gate 70 to discharge the objects to be weighed to the weighing hopper 64. Each weighing hopper 64 is divided into two chambers 64a and 64b. Each of the weighing chambers 64a and 64b is provided with a gate 71 to discharge the objects to be weighed onto the collecting chute 67 and a gate 72 to discharge the objects to be weighed to the memory hopper 65. Each memory hopper 65 is divided into two chambers 65a and 65 which are respectively provided with gates 73 to discharge the objects to be weighed onto the collecting chute 67. A feeding guide board 68 is provided above the feeding hopper 63 to select the chamber 63a or 63b to which the objects to be weighed sent from the linear feeder 62 are fed. The objects to be weighed in the chambers 63a and 63b of each feeding hopper 63 are fed to the chambers 64a and 64b of the weighing hopper 64 located immediately below the chambers 63a and 63b. The weight sensor 66 measures weight of the objects to be weighed in the chambers 64a and 64b. To the chambers 65a and 65b of the memory hopper 65, the objects to be weighed are fed from the corresponding chambers 64a and 64b of the weighing hopper 64 located immediately thereabove.

In the above described conventional combination weigher, combination calculation is performed based on the measured values of the objects to be weighed inside the chambers 64a and 64b of each weighing hopper 64 and inside the chambers 65a and 65b of each memory hopper 65, and the objects to be weighed are discharged from the chambers (64a, 64b, 65a, 65b) selected by the combination calculation onto the collecting chute 67.

DISCLOSURE OF THE INVENTION

In the above described conventional construction, since each weighing hopper 64 is divided into the two chambers 64a and 64b, each memory hopper 65 is divided into the two chambers 65a and 65b, and the combination calculation is performed based on the measured values of the objects to be weighed inside the chambers 64a and 64b of each weighing hopper 64 and inside the chambers 65a and 65b of each memory hopper 65, a plurality of measured values, which will be used in the combination calculation, can be gained for each weight sensor 66. Thus, efficient use of the weight sensor 66 which is expensive, is realized.

However, since the two chambers 64a and 64b of the weighing hopper 64 are arranged in a direction away from and close to the center base body 69 and the two chambers 65a and 65b of the memory hopper 65 are arranged in the direction away from and close to the center base body 69, the collecting chute 67 extended to an outward region of these chambers becomes large-sized, and thereby an outer shape dimension of the entire combination weigher including the collecting chute 67, is increased, making the combination weigher large-sized. In addition, since the objects to be weighed discharged from the chambers 64a and 65a located on outer side slide down on the collecting chute 67 over a longer distance, they are falling apart, and thereby a batch length of the objects to be weighed discharged from the collecting chute 67 (length of a tip to tail of the batch of the discharged objects to be weighed) is increased and discharge time therefore is increased, degrading its capability (operation speed).

The disclosed example of the present invention has been developed to solve the above described problems. An object of the disclosed example of the present invention is to provide a combination weigher which is capable of efficiently using an expensive weight sensor, reducing its own size, and reducing a batch length of objects to be weighed which are to be discharged and discharge time therefore.

A combination weigher of the present invention comprises a hopper support base body; a plurality of weighing hoppers each of which is disposed around the hopper support base body, includes two weighing chambers, and is coupled to a corresponding weight sensor which measures weight of objects to be weighed which have been fed into the two weighing chambers of the weighing hopper, the weighing chambers being each capable of discharging the objects to be weighed selectively in a first direction or in a second direction; a plurality of memory hoppers which are disposed below the weighing hoppers to respectively correspond to the weighing hoppers, the memory hoppers being each including an accommodating chamber corresponding to the two weighing chambers of the corresponding weighing hopper, the accommodating chambers being fed with the objects to be weighed which have been discharged in the first direction from the corresponding weighing chamber, the accommodating chamber being capable of discharging the objects to be weighed; a plurality of feeding means which are disposed above the weighing hoppers to respectively correspond to the weighing hoppers, the feeding means being each configured to feed the objects to be weighed to each of the two weighing chambers of the corresponding weighing hopper; a collecting chute having an outlet provided below the hopper support base body, the collecting chute being configured to receive the objects to be weighed which have been discharged from the weighing chamber in the second direction and the objects to be weighed which have been discharged from the accommodating chamber and to discharge the objects to be weighed from the outlet; and a control means which is configured to obtain a measured value from each weight sensor, to perform combination calculation based on measured values of the objects to be weighed which have been fed into the weighing chambers of each of the weighing hoppers and a measured value of the objects to be weighed which have been fed into the accommodating chamber of each of the memory hoppers to select weighing chambers and/or accommodating chamber which have been fed with the objects to be weighed whose total measured value falls within an allowable range with respect to a combination target weight, and to cause the selected weighing chambers and/or accommodating chamber to discharge the objects to be weighed onto the collecting chute; wherein the two weighing chambers of each of the weighing hoppers are arranged along a side surface of the hopper support base body and the accommodating chamber of each of the memory hoppers is arranged to correspond to the two weighing chambers.

According to such a construction, since the two weighing chambers of the weighing hopper are arranged along the side surface of the center base body, and the accommodating chamber of each memory hopper is disposed to correspond to the two weighing chambers, the size of the collecting chutes which receive the objects to be weighed discharged from the weighing hoppers and the memory hoppers can be reduced, an outer shape dimension of the entire combination weigher including the collecting chutes is not increased, and thereby the combination weigher can be small-sized. Furthermore, because of the reduced-size of the collecting chute, the objects to be weighed slide down on the collecting chute over a smaller distance, the objects to be weighed do not fall apart, and thereby a batch length of the objects to be weighed discharged from the collecting chute and discharge time therefore can be reduced. As a result, its capability (operation speed) is improved. Moreover, three measured values, which will be used in the combination calculation, can be gained for each weight sensor attached to the weighing hopper. Thus, efficient use of expensive weight sensors can be realized.

Each of the memory hoppers may include two accommodating chambers which are disposed to respectively correspond to the two weighing chambers of the corresponding weighing hopper, and are arranged along the side surface of the hopper support base body.

According to such a construction, since the two weighing chambers of the weighing hopper and the two accommodating chambers of the memory hopper are arranged along the side surface of the center base body, the size of the collecting chutes which receive the objects to be weighed discharged from the weighing hoppers and the memory hoppers can be reduced, an outer shape dimension of the entire combination weigher including the collecting chute is not increased, and thereby the combination weigher can be small-sized. Furthermore, because of the reduced-size of the collecting chute, the objects to be weighed slide down on the collecting chute over a smaller distance, the objects to be weighed do not fall apart, and thereby a batch length of the objects to be weighed discharged from the collecting chute and discharge time therefore can be reduced. As a result, its capability (operation speed) is improved. Moreover, four measured values, which will be used in the combination calculation, can be gained for each weight sensor attached to the weighing hopper. Thus, efficient use of expensive weight sensors can be realized.

Each of the memory hoppers may be disposed obliquely below the corresponding weighing hopper so as to be located closer to the hopper support base body relative to the corresponding weighing hopper; each of the weighing chambers of each of the weighing hoppers may have a bottom surface divided into a bottom surface which is near the hopper support base body and is formed by a first gate in a closed position and a bottom surface which is distant from the hopper support base body and is formed by a second gate in a closed position; the first gate may be opened in such a manner that the first gate rotates around a first horizontal axis to cause an edge portion of the first gate which is in contact with the second gate with the first and second gates being in the closed position to move away from the second gate and close to the hopper support base body, and the objects to be weighed are discharged from the weighing chamber in the first direction by opening the first gate; and the second gate may be opened in such a manner that the second gate rotates around a second horizontal axis to cause an edge portion of the second gate which is in contact with the first gate with the first and second gates being in the closed position to move away from the first gate and away from the hopper support base body, and the objects to be weighed are discharged from the weighing chamber in the second direction by opening the second gate.

In such a construction, the memory hopper is disposed inward of and obliquely below the weighing hopper (closer to the hopper support base body), the two weighing chambers of the weighing hopper are arranged along the side surface of the hopper support base body, the first gates of the weighing chambers of each weighing hopper to discharge the objects to be weighed to the memory hopper are configured to be opened inward, and the second gates of the weighing chambers of each weighing hopper to discharge the objects to be weighed onto the collecting chute are configured to be opened outward which is the reverse of inward. With such features, it becomes easy to discharge the objects to be weighed selectively to the collecting chute or to the accommodating chamber of the memory hopper, and to open the first gates of the weighing chambers inward to a large degree without interference. In addition, since the first gate can be opened to a large degree, time taken to feed the objects to be weighed from the weighing chamber to the accommodating chamber can be reduced.

In this case, furthermore, it is preferable that the accommodating chamber of each of the memory hoppers may have an inlet from which the objects to be weighed are fed from the weighing chamber of the weighing hopper into the accommodating chamber, and the inlet may have an opening which is defined by an upper edge thereof and receives the objects to be weighed, the opening being inclined upward toward the hopper support base body.

According to such a construction, since the opening formed on the upper part of the accommodating chamber of the memory hopper is inclined so as to face the weighing hopper located obliquely thereabove, the accommodating chamber can easily receive the objects to be weighed discharged from the weighing chamber located obliquely thereabove by opening the first gate, the size of the opening of the accommodating chamber is not increased, and thus the objects to be weighed can be prevented from falling off outside the accommodating chamber.

In addition, according to such a construction, reduction of combinations in the combination calculation can be suppressed, and combination precision can be improved.

It is preferable that each of the feeding means may be configured to, when the combination calculation and the discharging of the objects to be weighed are repeated, feed the objects to be weighed to only one of the two weighing chambers of the corresponding weighing hopper in a time period from combination calculation being performed currently to combination calculation being performed next; and the control means may be configured to perform the combination calculation on condition that the number of weighing chambers and/or accommodating chambers which are both selected simultaneously to form the combination from each of a plurality of combination units including the corresponding weighing hoppers and memory hoppers is limited to two or less.

Also, it is preferable that the control means may be configured to perform the combination calculation on condition that two weighing chambers and/or accommodating chambers are selected simultaneously to form the combination from combination units in which all the weighing chambers and accommodating chambers have been fed with the objects to be weighed.

Also, it is preferable that the control means may be configured to perform the combination calculation on condition that the number of combination units from which the two weighing chambers and/or accommodating chambers are selected simultaneously to form the combination is limited to one or less.

Also, it is preferable that the control means may be configured to perform the combination calculation on condition that, when three or more weighing chambers and/or accommodating chambers are selected simultaneously to form the combination and two of the three or more weighing chambers and/or accommodating chambers are selected from an arbitrary combination unit, remaining one or more weighing chambers and/or accommodating chambers are selected from combination units in which all the weighing chambers and accommodating chambers have been fed with the objects to be weighed such that the one or more chambers are selected from different combination units.

Also, it is preferable that a total number of the feeding means may be n, a total number of the weighing hoppers may be n, and a total number of the memory hoppers may be n; and weight of the objects to be weighed fed from each of the feeding means to the weighing chamber of the corresponding weighing hopper in every feeding may be approximately 1/n of the combination target weight.

According to such a configuration, the total number of weighing chambers and/or accommodating chambers selected to form a combination is approximately n in average, and the number of weight sensors attached to the weighing hoppers is n in total. Therefore, the use efficiency of the weight sensors becomes approximately 100%, and can be improved. Thus, more efficient use of the weight sensors can be realized.

The disclosed example of the present invention has the above described construction, and provides effects in which expensive weight sensors are efficiently used, the combination weigher is small-sized, and a batch length of the objects to be weighed which are discharged and discharge time therefore can be reduced.

The above and further objects, features and advantages of the invention will more fully be apparent from the following detailed description of preferred embodiments with accompanying drawings.

BRIEF DESCRIPTION OF THE DRAWINGS

FIG. 3(a) is a plan view of a feeding hopper and a weighing hopper in a combination weigher according to a second embodiment of the present invention, as viewed from above, FIG. 3(b) is a plan view of the weighing hopper and the memory hopper as viewed from above, FIG. 3(c) is a front view of the feeding hopper, the weighing hopper, and the memory hopper as viewed from outward, and FIG. 3(d) is a side view of the feeding hopper, the weighing hopper, and the memory hopper as viewed from laterally.

Figure 1A:
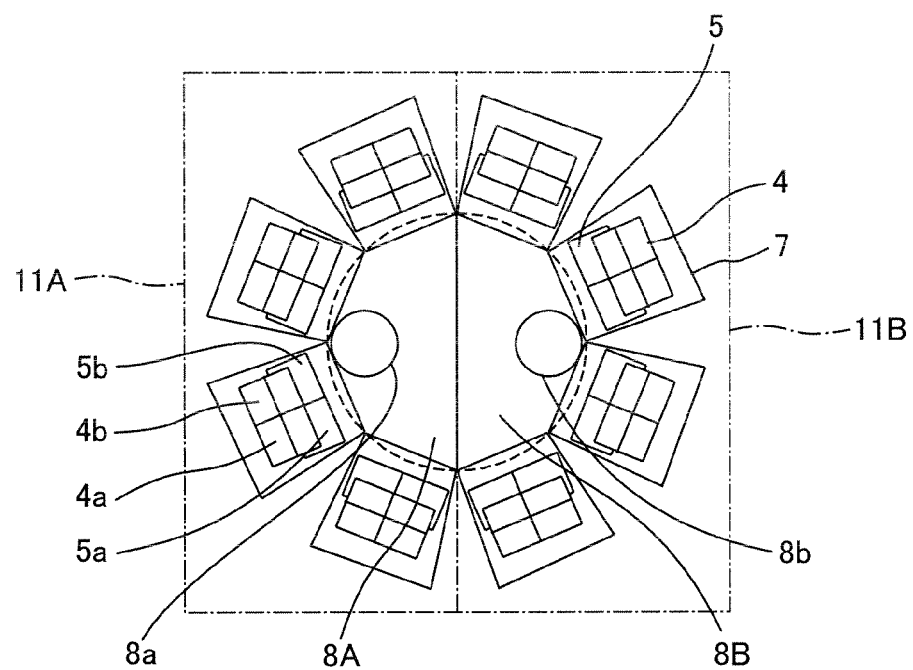
FIG. 1(a) is a plan view of a part of a combination weigher according to a first embodiment of the present invention, as viewed from above.

EXPLANATION OF REFERENCE NUMBERS 1. dispersion feeder
2. linear feeder
3. feeding hopper
4. weighing hopper
4a. weighing chamber
4b. weighing chamber
5. memory hopper
5a. accommodating chamber
5b. accommodating chamber
6. weight sensor
7. collecting chute
8A. collecting funnel
8B. collecting funnel
9. center base body
10. control unit
11A. combination weigher unit
11B. combination weigher unit Best Mode for Carrying Out the Invention Now, preferred embodiments of the present invention will be described below with reference to the drawings.

EMBODIMENT 1

Figure 1B:
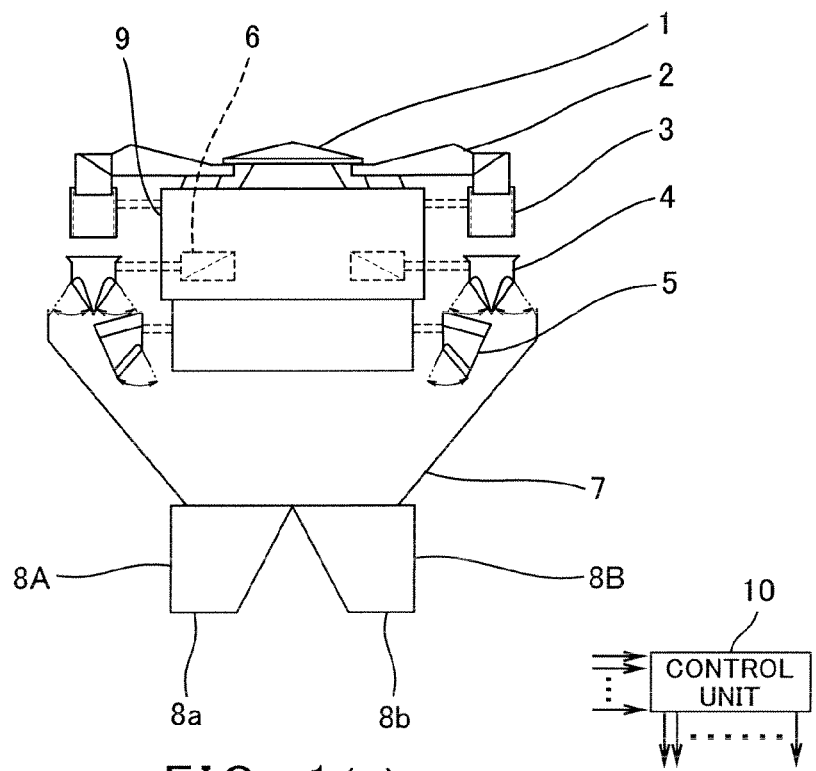
FIG. 1(b) is a schematic partial-cross sectional view of the combination weigher as viewed from laterally.

FIG. 1 is a schematic view showing a construction of a combination weigher according to a first embodiment of the present invention. FIG. 1(a) is a plan view of a part of the combination weigher, as viewed from above, and FIG. 1(b) is a schematic partial-cross sectional view of the combination weigher as viewed from laterally.

As shown in FIG. 1(b), the combination weigher is constructed in such a manner that a center base body (body) 9 which is a hopper support base body is disposed at a center of the combination weigher so as to be supported by, for example, four legs (not shown), and a dispersion feeder 1 having a conical shape is mounted to an upper portion of the center base body 9 to radially disperse objects to be weighed supplied from an external supplying device by vibration. Around the dispersion feeder 1, linear feeders 2 are provided to transfer the objects to be weighed sent from the dispersion feeder 1 into respective feeding hoppers 3 by vibration. A plurality of feeding hoppers 3, weighing hoppers 4, and memory hoppers 5 are disposed below the linear feeders 2 and are arranged circularly around the center base body 9 in such a manner that each feeding hopper 3, each weighing hopper 4, and each memory hopper 5 correspond to the associated one of the linear feeders 2. The dispersion feeder 1, the linear feeders 2, the feeding hoppers 3, the weighing hoppers 4, and the memory hoppers 5 are mounted to the center base body 9, and drive units therefore (vibration devices for the dispersion feeder 1 and the linear feeders 2, gate opening and closing devices for the feeding hoppers 3, the weighing hoppers 4, and the memory hoppers 5, etc) are accommodated in the center base body 9. Each weighing hopper 4 is attached with a weight sensor 6 such as a load cell, which measures the weight of the objects to be weighed inside the weighing hopper 4. The weight sensor 6 is accommodated along with the drive units in the centre base body 9. In FIG. 1(a), the dispersion feeder 1, the linear feeders 2, the feeding hoppers 3, and the center base body 9 are not illustrated.

A collecting chute 7 is disposed below each weighing hopper 4 and each memory hopper 5. Assuming that the linear feeder 2, the feeding hopper 3, the weighing hopper 4, the memory hopper 5, and the collecting chute 7 which correspond to each other are one object flow unit, eight object flow units are arranged circularly in FIG. 1(a), although the linear feeders 2 and the feeding hoppers 3 are not illustrated in FIG. 1(a). A collecting funnel 8A is disposed at lower parts of four collecting chutes 7 of the left four object flow units to collect the objects to be weighed sliding down on the four collecting chutes 7 and to discharge them from an outlet 8a. The left four object flow units, the corresponding drive units, weight sensors 6, and collecting funnel 8A constitute a combination weigher unit 11A operating as a single combination weigher. Likewise, a collecting funnel 8B is disposed at lower parts of four collecting chutes 7 of the right four object flow units to collect the objects to be weighed sliding down on the four collecting chutes 7 and to discharge them from an outlet 8b. The right four object flow units, the corresponding drive units, weight sensors 6, and collecting funnel 8B constitute a combination weigher unit 11B operating as a single combination weigher.

The control unit 10 controls the entire combination weigher comprising the dispersion feeder 1 and the two combination weigher units 11A and 11B. Two packaging machines which are not shown are disposed below the combination weigher. The two combination weigher units 11A and 11B are independently operable under control of the control unit 10. The objects to be weighed which have been discharged from the outlet 8a of the collecting funnel 8A of the combination weigher unit 11A are fed into one of the packaging machines, and the objects to be weighed which have been discharged from the outlet 8b of the collecting funnel 8B of the combination weigher unit 11B are fed into the other packaging machine. The collecting funnels 8A and 8B open in a semicircular shape at their upper parts and have the outlets 8a and 8b forming circular openings at their lower parts. The four collecting chutes 7 of the combination weigher units 11A may be formed in one unitary component. These collecting chutes 7 and the collecting funnel 8A may be assumed to constitute a collecting chute to discharge the objects to be weighed in the combination weigher unit 11A. The same applies to the combination weigher unit 11B. It should be noted that a member such as a separating board may be provided at a boundary between the collecting funnels 8A and 8B so that the objects to be weighed sliding down on the collecting chutes 7 of the combination weigher units 11A and 11B are prevented from falling into wrong collecting funnels.

Figure 2:
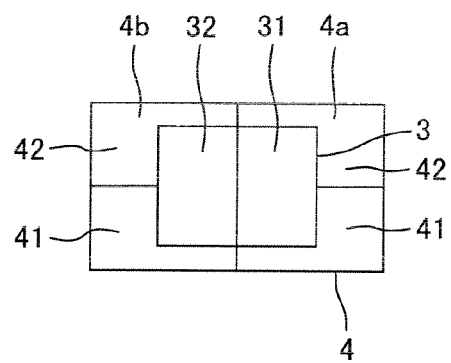
FIG. 2(a) is a plan view of a feeding hopper and a weighing hopper in the combination weigher according to the first embodiment of the present invention, as viewed from above.
FIG. 2(b) is a plan view of the weighing hopper and a memory hopper as viewed from above.
FIG. 2(c) is a front view of the feeding hopper, the weighing hopper, and the memory hopper as viewed from outward.
FIG. 2(d) is a view of the feeding hopper, the weighing hopper, and the memory hopper as viewed from laterally.
Figure 2:
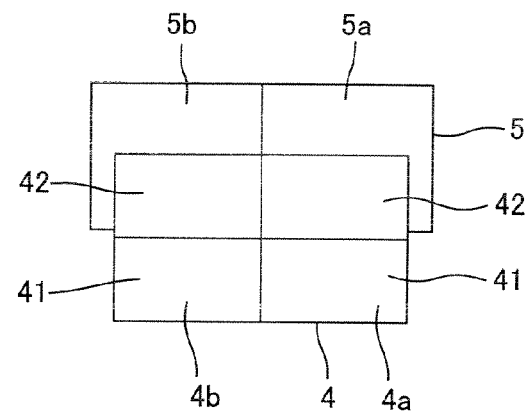
Figure 2:
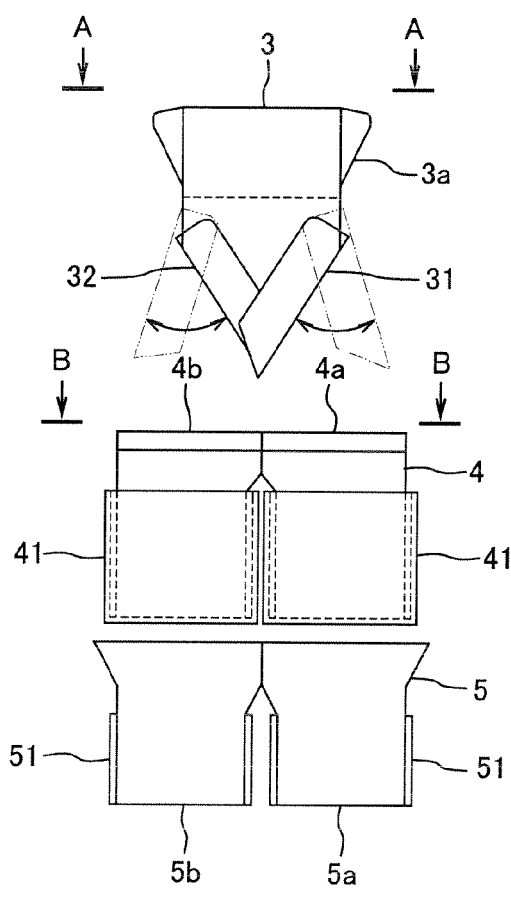
Figure 2:
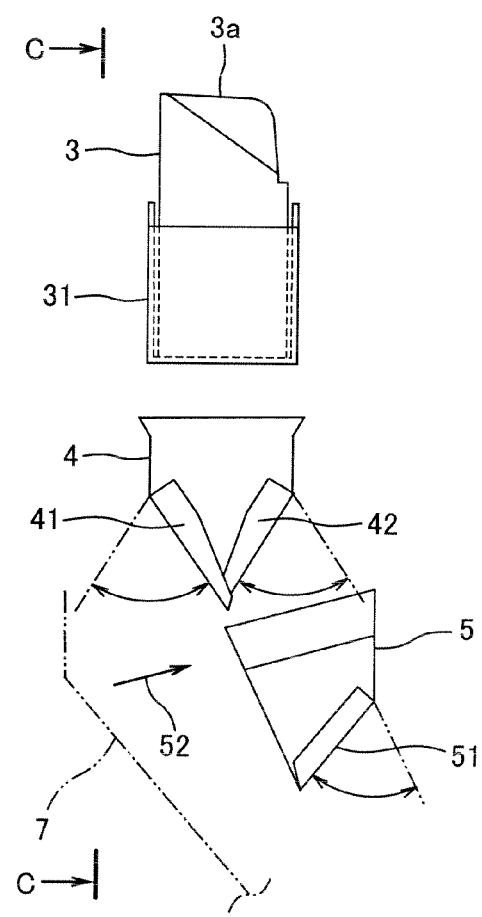

FIG. 2 is a view showing a schematic construction of the feeding hopper 3, the weighing hopper 4, and the memory hopper 5 in the combination weigher of this embodiment. FIG. 2(d) is an enlarged view of, for example, the feeding hopper 3, the weighing hopper 4 and the memory hopper 5 shown on the left side in FIG. 1(b). FIG. 2(c) is a view shown as FIG. 2(d) is viewed in the direction of arrows C-C (the memory hopper 5 of FIG. 2(c) is viewed in the direction of arrow 52 in FIG. 2(d)). FIG. 2(a) is a schematic view shown as the feeding hopper 3 and the weighing hopper 4 of FIG. 2(c) are viewed in the direction of arrows A-A and FIG. 2(b) is a schematic view shown as the weighing hopper 4 and the memory hopper 5 of FIG. 2(c) are viewed in the direction of arrows B-B. FIG. 2(a) shows planar arrangement of portions of the feeding hopper 3 and the weighing hopper 4 where the objects to be weighed are accommodated, and does not show, for example, a bent portion 3a provided at an upper part of the feeding hopper 3 to enable the feeding hopper 3 to easily receive the objects to be weighed from the linear feeder 2, or the like. Likewise, FIG. 2(b) shows planar arrangement of portions of the weighing hopper 4 and the memory hopper 5 where the objects to be weighed are accommodated.

The weighing hopper 4 including two weighing chambers 4a and 4b is disposed below the feeding hopper 3. The memory hopper 5 including two accommodating chambers 5a and 5b respectively corresponding to the weighing chambers 4a and 4b of the weighing hopper 4 is disposed obliquely below the weighing hopper 4.

The feeding hopper 3 is provided with two gates 31 and 32 capable of being independently driven. By opening one of the gates 31 and 32, the feeding hopper 3 is configured to be able to selectively discharge the objects to be weighed to the weighing chamber 4a or to the weighing chamber 4b of the weighing hopper 4. When the gate 31 is opened, the objects to be weighed are discharged to the weighing chamber 4a, while when the gate 32 is opened, the objects to be weighed are discharged to the weighing chamber 4b.

The weighing hoppers 4a and 4b of the weighing hopper 4 are each provided with two gates 41 and 42 capable of being independently driven. By opening one of the gates, the weighing hopper 4 selectively discharges the objects to be weighed independently from the weighing chambers 4a and 4b to the collecting chute 7 or to the corresponding accommodating chambers 5a and 5b of the memory hopper 5. Each of the weighing chambers 4a and 4b has a bottom surface divided into a bottom surface near the center base body 9 and a bottom surface distant from the center base body 9. The bottom surface near the center base body 9 is formed by the gate 42 in a closed position, and the bottom surface distant from the center base body 9 is formed by the gate 41 in a closed position. The gate 42 is opened in such a manner that the gate 42 rotates around a first horizontal axis to cause an edge portion of the gate 42 which is in contact with the gate 41 with the gate 41 and the gate 42 being in the closed position to move away from the gate 41 and close to the center base body 9. The gate 41 is opened in such a manner that the gate 41 rotates around a second horizontal axis to cause an edge portion of the gate 41 which is in contact with the gate 42 with the gate 41 and the gate 42 being in the closed position to move away from the gate 42 and away from the center base body 9. When the gate 41 of the weighing chamber 41a is opened, the objects to be weighed are discharged onto the collecting chute 7, while when the gate 42 of the weighing chamber 4a is opened, the objects to be weighed are discharged into the accommodating chamber 5a of the memory hopper 5. In the same manner, when the gate 41 of the weighing chamber 4b is opened, the objects to be weighed are discharged onto the collecting chute 7, while when the gate 42 of the weighing chamber 4b is opened, the objects to be weighed are discharged into the accommodating chamber 5b of the memory hopper 5.

The accommodating chambers 5a and 5b of the memory hopper 5 are respectively provided with gates 51. By opening the gates, the memory hopper 5 discharges the objects to be weighed onto the collecting chute 7 independently from the accommodating chambers 5a and 5b. Each of the accommodating chambers 5a and 5b has a bottom surface formed by the corresponding gate 51 in a closed position. The gate 51 is opened in such a manner that the gate 51 rotates around a third horizontal axis to cause an edge portion of the gate 51 which is distant from the centre base body 9 to move away from an edge portion of a lower end of a side surface of the corresponding accommodating chamber and close to the center base body 9, thereby discharging the objects to be weighed onto the collecting chute 7.

In the above construction, as shown in FIG. 2(d), the memory hopper 5 is disposed inward of (closer to a center axis of the center base body 9), and obliquely below the weighing hopper 4, the two weighing chambers 4a and 4b of the weighing hopper 4 are arranged substantially along the side surface of the center base body 9, both of the two gates 42 of the weighing chambers 4a and 4b of the weighing hopper 4 for discharging the objects to be weighed to the memory hopper 5 are configured to open inward, and both of the two gates 41 of the weighing chambers 4a and 4b of the weighing hopper 4 for discharging the objects to be weighed onto the collecting chute 7 are configured to open outward which is the reverse of inward. With such features, it becomes easy to selectively discharge the objects to be weighed from the weighing chambers 4a and 4b onto the collecting chute 7 or to the accommodating chambers 5a and 5b of the memory hopper 5, and to open the two gates 42 of the weighing chambers 4a and 4b inward to a large degree without interference. In addition, since the gates 42 can be opened to a large degree, time taken to feed the objects to be weighed from the weighing chambers 4a and 4b to the accommodating chambers 5a and 5b can be reduced.

An inlet of each of the accommodating chambers 5a and 5b of the memory hopper 5, from which the objects to be weighed are fed thereinto from the weighing chambers 4a and 4b of the weighing hopper 4, has an opening for receiving the objects to be weighed which is defined by an upper edge of the inlet and is inclined upward toward the center base body 9. To be specific, as shown in FIG. 2(d), the opening of an upper region of each of the accommodating chambers 5a and 5b of the memory hopper 5 is inclined so as to face the weighing hopper 4 disposed obliquely thereabove. This enables the accommodating chambers 5a and 5b to easily receive the objects to be weighed which have been discharged by opening the gates 42 of the weighing chambers 4a and 4b, so that the size of the openings of the accommodating chambers 5a and 5b does not increase, and the objects to be weighed can be prevented from falling off outside the accommodating chambers 5a and 5b.

As shown in FIG. 1(b), the weight sensor 6 attached to each weighing hopper 4 sends a measured value to the control unit 10. In each weighing hopper 4, when the objects to be weighed are fed only to one of the weighing chambers, for example, the weighing chamber 4a, the weight sensor 6 measures the weight of the objects to be weighed inside the weighing chamber 4a. When the objects to be weighed are fed to the other weighing chamber 4b, the weight sensor 6 measures the total weight of the objects to be weighed inside the two weighing chambers 4a and 4b. The control unit 10 calculates the measured value of the objects to be weighed inside the weighing chamber 4b by subtracting the measured value of the objects to be weighed inside the weighing chamber 4a that has been previously measured, from the total weight (measured value) of the objects to be weighed inside the two weighing chambers 4a and 4b. When the objects to be weighed are fed from the weighing chambers 4a and 4b to the accommodating chambers 5a and 5b, the control unit 10 recognizes the measured values of the objects to be weighed which have been measured and calculated for the weighing chambers 4a and 4b as the measured values of the objects to be weighed fed into the accommodating chambers 5a and 5b.

The control unit 10 performs combination calculation, with respect to each of the combination weigher units 11A and 11B, based on the measured values of the objects to be weighed inside the weighing chambers 4a and 4b of each weighing hopper 4 and inside the accommodating chambers 5a and 5b of each memory hopper 5. By the combination calculation, weighing chambers and accommodating chambers forming a combination which have been fed with the objects to be weighed whose total measured value falls within an allowable range (predetermined weight range) with respect to a combination target weight are selected from the weighing chambers 4a and 4b of the plurality of weighing hoppers 4 and the accommodating chambers 5a and 5b of the plurality of memory chambers 5, and the total measured value of the objects to be weighed inside the weighing chambers 4a and 4b and the accommodating chambers 5a and 5b selected to form the combination is determined as a combination measured value. In a case where there are plural combinations having the objects to be weighed whose total measured values fall within the allowable range with respect to the combination target weight, a combination that minimizes a difference between the total measured value of the objects to be weighed and the combination target weight is selected.

The center base body 9 is substantially cylindrical and includes an upper cylindrical part with a larger diameter, and a lower cylindrical part with a diameter smaller than that of the upper cylindrical part. The two weighing chambers 4a and 4b of each weighing hopper 4 are arranged horizontally substantially along a tubular side surface of the upper cylindrical part of the center base body 9. The accommodating chambers 5a and 5b of each memory hopper 5 are arranged horizontally substantially along a tubular side surface of the lower cylindrical part of the center base body 9 and are disposed obliquely below the weighing chambers 4a an 4b so as to be located closer to the center axis of the center base body 9 (center axis of a substantially cylindrical body). There are combination weighers equipped with center base bodies 9 having shapes such as a quadrangular prism or a cylinder with a semicircular cross-section, rather than the substantially cylindrical shape. In those cases, also, the weighing chambers 4a and 4b and the accommodating chambers 5a and 5b maybe arranged horizontally substantially along the tubular side surface of the center base body and the memory hoppers 5 maybe disposed obliquely below the weighing hoppers 4 so as to locate them closer to the tubular side surface of the center base body.

The operation of the combination weigher constructed above will now be described. The combination weigher units 11A and 11B operate independently as described above, but their operations are similar and therefore will not be distinguished from each other hereinbelow.

The objects to be weighed are supplied from the external supplying device to the dispersion feeder 1 and are fed from the dispersion feeder 1 to each feeding hopper 3 through each linear feeder 2. One of the two gates 31 and 32 of each feeding hopper 3 is opened and closed to feed the objects to be weighed into one of the two weighing chambers 4a and 4b of the weighing hopper 4. Initially, this operation is repeated twice to feed the objects to be weighed to both of the weighing chambers 4a and 4b. When the accommodating chambers 5a and 5b of the memory hopper 5 are empty, the gates 42 of the corresponding weighing chambers 4a and 4b are opened and closed to feed the objects to be weighed to the accommodating chambers 5a and 5b which are empty.

The control unit 10 performs the combination calculation with respect to each of the combination weigher units 11A and 11B based on the measured values of the objects to be weighed inside the weighing chambers 4a and 4b and the accommodating chambers 5a and 5b as described above, and opens and closes the gates 41 of the weighing chambers 4a and 4b and the gates 51 of the accommodating chambers 5a and 5b which have been selected to form the combination in each of the combination weigher units 11A and 11B, in response to a feed command signal from the corresponding packaging machine. Thereby, the objects to be weighed are discharged from the weighing chambers 4a and 4b and the accommodating chambers 5a and 5b to the corresponding collecting chutes 7 and slide down on these collecting chutes 7 to be gathered into the collecting funnel 8A or 8B. The objects to be weighed are sent out from the outlet 8a or 8b to the corresponding packaging machine.

Now, a combination and discharge and feeding operation in one object flow unit will be described. For example, here it is assumed that all of the four chambers 4a, 4b, 5a and 5b have been fed with the objects to be weighed, and thus can participate in a combination. If only one weighing chamber (e.g., 4a) is selected to form a combination by the combination calculation, the weighing chamber 4a discharges the objects to be weighed and the feeding hopper 3 located thereabove feeds the objects to be weighed to the weighing chamber 4a. In this case, in next combination calculation, all of the above four chambers can participate in a combination. If only one accommodating chamber (e.g., 5a) is selected to form a combination by the combination calculation, the accommodating chamber 5a discharges the objects to be weighed and the weighing chamber 4a located thereabove feeds the objects to be weighed to the accommodating chamber 5a, and further, the feeding hopper 3 feeds the objects to be weighed to the weighing chamber 4a. In this case, in next combination calculation, all of the above four chambers can participate in a combination. If both of weighing chambers 4a and 4b are selected to form a combination by combination calculation, then these weighing chambers 4a and 4b discharge the objects to be weighed, and the feeding hopper 3 located thereabove feeds the objects to be weighed to one of the weighing chambers (e.g., 4a). In this case, in next combination calculation, the other weighing chamber 4b is empty and thus cannot participate in a combination, and the remaining three chambers can participate in the combination. Also, if both of the accommodating chambers 5a and 5b are selected to form a combination by combination calculation, then these accommodating chambers 5a and 5b discharge the objects to be weighed, the weighing chambers 4a and 4b feed the objects to be weighed to the accommodating chambers 5a and 5b, and the feeding hopper 3 feeds the objects to be weighed to one of the weighing chambers (e.g., 4a). In this case, in next combination calculation, the other weighing chamber 4b is empty and thus cannot participate in a combination, and the remaining three chambers can participate in the combination. Furthermore, if the corresponding weighing chamber (e.g., 4a) and accommodating chamber (e.g., 5a) are selected to form a combination by combination calculation, then these two chambers 4a and 5a discharge the objects to be weighed, and the feeding hopper 3 feeds the objects to be weighed to the empty weighing chamber 4a. In this case, in next combination calculation, the accommodating chamber 5a is empty and thus cannot participate in a combination, and the remaining three chambers can participate in the combination. If the weighing chamber (e.g., 4a) and the accommodating chamber (e.g., 5b) which do not correspond to each other are selected to form a combination by combination calculation, then the two chambers 4a and 5b discharge the objects to be weighed, the weighing chamber 4b feeds the objects to be weighed to the accommodating chamber 5b, and the feeding hopper 3 feeds the objects to be weighed to the empty weighing chamber 4a. In this case, in next combination calculation, the weighing chamber 4b is empty and thus cannot participate in a combination, and the remaining three chambers can participate in the combination. Similar operation may take place in cases where three or more chambers are selected to form a combination by combination calculation. If three chambers are selected to form a combination, in next combination calculation, two chambers are empty and thus cannot participate in a combination, and the remaining two chambers can participate in the combination. If four chambers are selected to form a combination, in next combination calculation, three chambers are empty and thus cannot participate in a combination, and the remaining one chamber (weighing chamber) can participate in the combination.

In this embodiment, four measured values, which will be used in the combination calculation, are gained for each weight sensor 6 attached to each weighing hopper 4. Thus, efficient use of the weight sensor 6 is realized.

Figure 4:
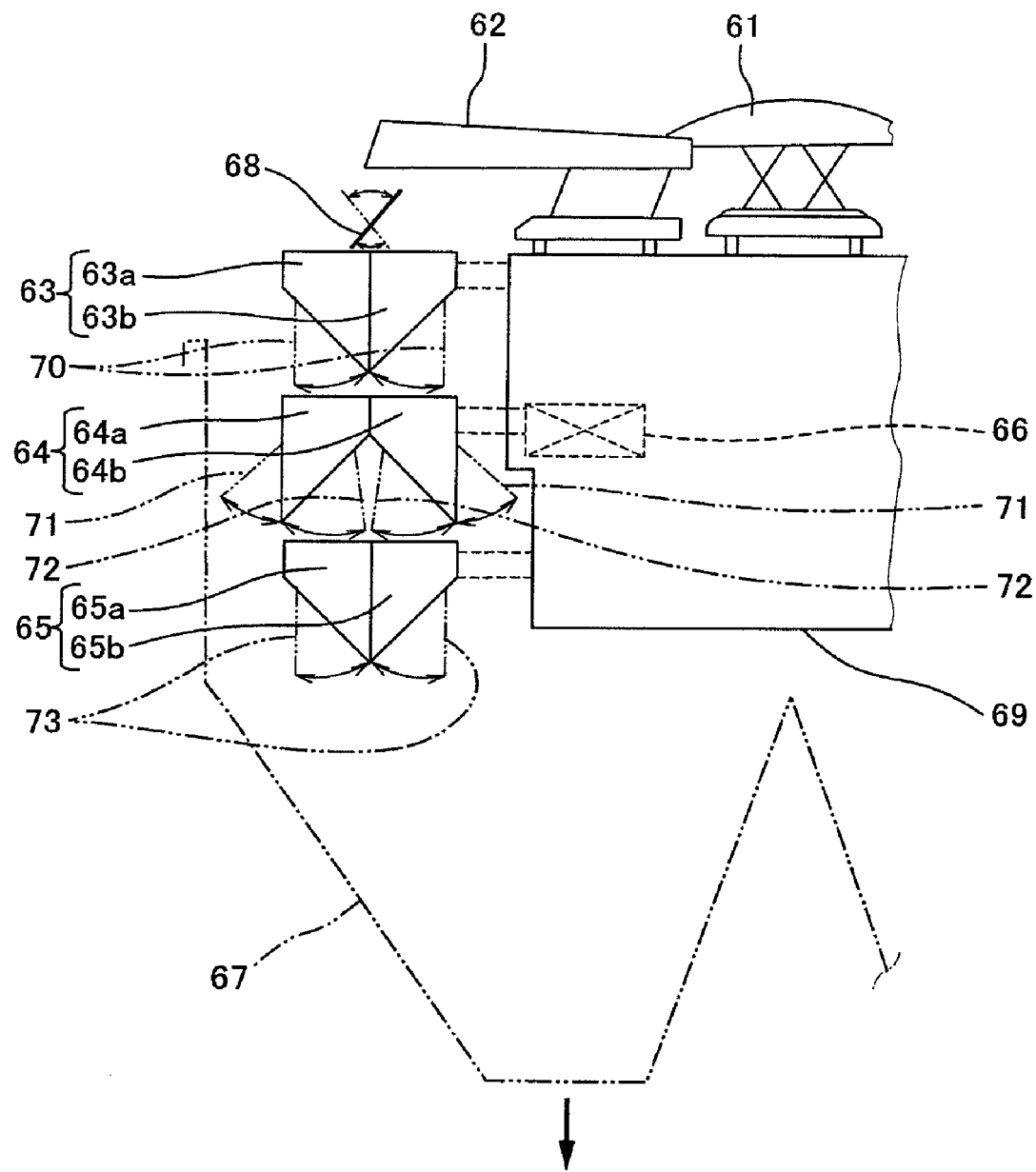
FIG. 4 is a side view snowing a schematic construction of a conventional combination weigher.

In addition, since the two weighing chambers 4a and 4b of the weighing hopper 4 and the two accommodating chambers 5a and 5b of the memory hopper 5 are arranged substantially along the side surface of the center base body 9, the size of the collecting chutes 7 can be reduced, and thereby an outer shape dimension of the entire combination weigher including the collecting chutes 7 is not increased, making the combination weigher small-sized, in contrast to the conventional example shown in FIG. 4 in which the two chambers 64a and 64b of the weighing hopper 64 are arranged in the direction away from and close to (hereinafter expressed as inward and outward in the combination weigher) the side surface of the center base body 69, and the two chambers 65a and 65b of the memory hopper 65 are arranged inward and outward in the combination weigher. Furthermore, because of the reduced-size of the collecting chutes 7, the objects to be weighed slide down on the collecting chute 7 over a smaller distance, the objects to be weighed do not fall apart, and thereby a batch length of the objects to be weighed discharged from the collecting chutes 7 and discharge time therefore can be reduced. As a result, its capability (operation speed) is improved.

In the conventional example, the memory hopper 65 is disposed immediately below the weighing hopper 64, and the collecting chute 67 receives the objects to be weighed when the discharge gate 71 of the outer chamber 64a of the weighing hopper 64 and the discharge gate 73 of the outer chamber 65a of the memory hopper 65 are opened, and a space for the objects to be weighed to pass therethrough is needed. For this reason, the collecting chute 67 is required to be extended to an outward region, and to have a long vertical surface on its outer side as shown in FIG. 4, increasing the size of the collecting chute 67. On the other hand, in this embodiment, since the memory hopper 5 is disposed inward of and obliquely below the weighing hopper 4 and the gate opening outward is not needed in the memory hopper 5, the size of the collecting chute 7 can be reduced, the objects to be weighed sliding down on the collecting chute 7 do not fall apart, and discharge time therefore can be reduced. As a result, its capability (operation speed) is improved.

In the construction of the conventional example, in which the two chambers 64a and 64b of the weighing hopper 64 are arranged inward and outward in the combination weigher, the two chambers 65a and 65b of the memory hopper 65 are arranged inward and outward in the combination weigher, and the memory hopper 65 is disposed immediately below the weighing hopper 64, the gates 72 of the chambers 64a and 64b provided to discharge the objects to be weighed from the weighing hopper 64 to the memory hopper 65 located therebelow must be positioned adjacent each other, and not to collide against each other when both of the gates 72 are opened. For these reasons, this conventional combination weigher has drawbacks that a horizontal opening area of the gates 72 of the weighing hopper 64 becomes small, discharge time of the objects to be weighed becomes long, and as a result its capability (operation speed) is degraded. In contrast, in this embodiment, since the two weighing chambers 4a and 4b of the weighing hopper 4 and the two accommodating chambers 5a and 5b of the memory hopper 5 are arranged substantially along the side surface of the center base body 9, and the memory hopper 5 is disposed obliquely below the weighing hopper 4, a horizontal opening area of the gates 42 of the weighing chambers 4a and 4b can be increased, and time taken to feed the objects to be weighed from the weighing hopper 4 to the memory hopper 5 can be reduced. As a result, its capability (operation speed) can be improved.

In the conventional example, since the chambers 64a and 64b of the weighing hopper 64 are disposed inward and outward in the combination weigher and the memory hopper 65 is disposed immediately below the weighing hopper 64, the objects to be weighed are discharged from the weighing hopper 64 onto the collecting chute 67 so as to fall away the memory hopper 65 located immediately therebelow, and the gates 72 forming the bottom surfaces of the chambers 64a and 64b are required to be inclined to have a certain angle with respect to a horizontal plane so that the objects to be weighed are caused to fall off from the chambers 64a and 64b. For this reason, the conventional combination weigher has drawbacks that the length of the gates 72 is increased, the height of the weighing hopper 64 is increased, and thus the height of the entire combination weigher is increased. In contrast, in this embodiment, since the two weighing chambers 4a and 4b of the weighing hopper 4 are arranged substantially along the side surface of the center base body 9, and the memory hopper 5 is disposed obliquely below the weighing hopper 4, it becomes easy to discharge the objects to be weighed from the weighing chambers 4a and 4b onto the collecting chute 7 away from the memory hopper 5. Also, the length of the gates 41 of the weighing chambers 4a and 4b is small, the height of the weighing hopper 4 is small, and thus the height of the entire combination weigher is not increased.

In the conventional example, since the two chambers 64a and 64b of the weighing hopper 64 are arranged inward and outward in the combination weigher and the two chambers 65a and 65b of the memory hopper 65 are arranged inward and outward in the combination weigher, falling distances of the objects to be weighed falling from the four chambers 64a, 64b, 65a, and 65b onto the inclined collecting chute 67 are different from each other, and sliding distances of the objects to be weighed sliding down on the collecting chute 67 are different from each other, the combination weigher has drawbacks that the batch length of the objects to be weighed discharged from the collecting chute 67 is increased, the discharge time therefore becomes longer, and its capability (operation speed) is degraded. In contrast, in this embodiment, since the two weighing chambers 4a and 4b of the weighing hopper 4 and the two accommodating chambers 5a and 5b of the memory hopper 5 are arranged substantially along the side surface of the center base body 9, falling distances of the objects to be weighed discharged from the two weighing chambers 4a and 4b onto the collecting chute 7 are equal, sliding distances of the objects to be weighed sliding down on the collecting chute 7 are equal, falling distances of the objects to be weighed discharged from the two accommodating chambers 5a and 5b onto the collecting chute 7 are equal, and sliding distances of the objects to be weighed sliding down on the collecting chute 7 are equal. Therefore, the discharge time of the objects to be weighed can be reduced, and its capability (operation speed) can be improved, as compared to the conventional example.

In this embodiment, the number of measured values used in the combination calculation are four to correspond to the weighing chambers 4a and 4b of the weighing hopper 4 and the accommodating chambers 5a and 5b of the memory hopper 5 in each object flow unit, and four object flow units are equipped in each of the combination weigher units 11A and 11B. Therefore, the combination calculation is performed based on sixteen measured values in total with respect to each of the combination weigher units 11A and 11B. Since general combination weighers can gain satisfactory combination precision (weighing precision of the combination measured values) using ten measured values, higher combination precision is gained in each of the combination weigher units 11A and 11B.

If both of the two weighing chambers 4a and 4b have been selected to form a combination and have discharged the objects to be weighed in each object flow unit, then the feeding hopper 3 feeds the objects to be weighed to only one of the two weighing chambers 4a and 4b before next combination calculation starts. For example, which of the two weighing chambers 4a and 4b are fed with the objects to be weighed from the feeding hopper 3 maybe determined in advance.

If plural chambers have been selected simultaneously from the two weighing chambers 4a and 4b and the two accommodating chambers 5a and 5b in each object flow unit, there are empty chambers which cannot participate in a combination in next combination calculation, because the feeding hopper 3 feeds the objects to be weighed only to one weighing chamber before next combination calculation starts. This reduces combinations. For example, if all of the four chambers 4a and 4b and 5a and 5b have been selected to form a combination in an object flow unit, then only one weighing chamber can participate in a combination in next combination calculation. This reduces combinations, and as a result degrades combination precision.

To solve this, the control unit 10 maybe configured to perform the combination calculation under the conditions described below with respect to each of the combination weigher units 11A and 11B, thereby improving combination precision in each of the combination weigher units 11A and 11B. Hereinbelow, the weighing hopper 4 and the memory hopper 5 in each object flow unit are referred to as a combination unit and the chambers 4a and 4b and 5a and 5b in each object flow unit are referred to as combination chambers. In this embodiment, therefore, each of the combination weigher units 11A and 11B has four combination units and each combination unit has four combination chambers.

A first condition under which the combination calculation is performed is that the number of combination chambers selected simultaneously to form a combination from each of the combination units is limited to two or less. In this embodiment, this is intended to inhibit three or more combination chambers from being selected simultaneously from each of the four combination units in each of the combination weigher units 11A and 11B. If two combination chambers have been selected from a combination unit, then the combination chambers which can participate in a combination in next combination calculation is reduced by one, and further reduction of combinations is suppressed, thus improving combination precision.

A second condition under which the combination calculation is performed is that two combination chambers are selected simultaneously to form a combination from the combination units in which all the combination chambers have been fed with the objects to be weighed, in addition to the first condition. In this embodiment, this is intended to permit that two combination chambers can be selected simultaneously only from the combination units in which all the four combination chambers have been fed with the objects to be weighed. Thereby, two combination chambers are not selected in succession from a combination unit. As a result, extreme reduction of combinations in a combination unit can be suppressed, and the number of combination chambers in each combination unit which can participate in a combination can be maintained at three or more. The second condition may be replaced by a condition A described below. The condition A under which the combination calculation is performed, is that two combination chambers are selected simultaneously to form a combination from the combination units in which all the combination chambers or combination chambers except one have been fed with the objects to be weighed, in addition to the first condition. Under the condition A, two combination chambers can be selected simultaneously from the combination unit in which the combination chambers except one empty combination chamber have been fed with the objects to be weighed, as well as from the combination unit in which all the combination chambers have been fed with the objects to be weighed. According to the condition A, in this embodiment, the combination chambers in each combination unit which can participate in a combination can be maintained at two or more in number, but combination precision is slightly reduced as compared to the second condition.

A third condition under which the combination calculation is performed is that the number of the combination units from which two combination chambers are selected simultaneously to form a combination, is limited to one or less, in addition to the second condition. This makes it possible to suppress, to one or less, reduction of the number of combination chambers in each of the combination weigher units 11A and 11B which can participate in a combination in next combination calculation.

A fourth condition under which the combination calculation is performed is that when three or more combination chambers are selected simultaneously to form a combination and two of them are selected from an arbitrary combination unit, the remaining one or more combination chambers are selected from combination units in which all the combination chambers have been fed with the objects to be weighed such that the one or more combination chambers are selected from different combination units, in addition to the third condition. According to the fourth condition, even if combination in which two chambers are selected simultaneously from a combination unit occurs in sequential combination cycles in each of the combination weigher units 11A and 11B, fifteen out of sixteen combination chambers can always participate in a combination in each of the combination weigher units 11A and 11B.

By performing combination calculation under the above stated conditions, combination precision can be improved further in the order of the first condition, the second condition, the third condition, and the fourth condition.

In this embodiment, four combination units (weighing hoppers 4 and memory hoppers 5) in total are equipped in each of the combination weigher units 11A and 11B. So, by setting the weight of the objects to be weighed which are to be fed from each feeding hopper 3 to the weighing chamber of the weighing hopper 4 in every feeding to approximately one fourth of the combination target weight, the use efficiency of the weight sensors 6 can be improved.

For example, in general combination weigher including ten weighing hoppers each having one chamber, typically, it is desired that four weighing hoppers be selected from ten weighing hoppers to form a combination. In this case, there are ten weight sensors which are attached to the weighing hoppers, but the use efficiency is 40% because only four sensors are operating actually. On the other hand, by setting the weight of the objects to be weighed which are to be fed from each feeding hopper 3 in every feeding to approximately one fourth of the combination target weight as described above, approximately four combination chambers (weighing chambers, accommodating chambers) in average are selected for each combination in each of the combination weigher units 11A and 11B, and approximately 100% use efficiency of the weight sensors 6 is gained because four weight sensors 6 are equipped in each of the combination weigher units 11A and 11B. Thus, by setting the number of combination units in each of the combination weigher units 11A and 11B to n (e.g., n=3, 4, 5, 6 . . . ) and by setting the weight of the objects to be weighed fed from the feeding hopper 3 in every feeding to approximately 1/n of the combination target weight, approximately 100% use efficiency is gained. By improving the use efficiency of the weight sensors 6 in this manner, more efficient use of the weight sensors 6, which are expensive, can be realized.

EMBODIMENT 2

A combination weigher according to a second embodiment of the present invention is identical to the combination weigher according to the first embodiment except that the accommodating chamber of the memory hopper 5 is not divided into the two accommodating chambers 5a and 5b in the construction of FIG. 1. FIG. 3 is a view showing a schematic construction of the feeding hopper 3, the weighing hopper 4, and the memory hopper 5 in the combination weigher of this embodiment. FIGS. 3(a), 3(b), 3(c), and 3(d) are respectively illustrated as in FIGS. 2(a), 2(b), 2(c), and 2(d) in the first embodiment.

As shown in FIGS. 3(b) and 3(c), the memory hopper 5 of this embodiment is provided with a gate 51 and has one large accommodating chamber having a volume equal to those of the two accommodating chambers 5a and 5b in the first embodiment, and the weighing chambers 4a and 4b of the weighing hopper 4 feed the objects to be weighed to the accommodating chamber (it should be noted that the number of the weighing chambers which feed the objects to be weighed in every discharge is one). Therefore, an opening area of an upper part of the memory hopper 5 through which the objects to be weighed are fed thereinto is substantially equal to a sum of opening areas of the two accommodating chambers 5a and 5b in the first embodiment, and the gate 51 provided at a lower part of the memory hopper 5 has an area approximately twice as large as that of the gate 51 of the first embodiment.

In this embodiment, since the number of measured values used in the combination calculation is three to correspond to the weighing chambers 4a and 4b of the weighing hopper 4 and the memory hopper 5 (one accommodating chamber) in each object flow unit, and four object flow units are equipped in each of the combination weigher units 11A and 11B, combination calculation is performed based on twelve measured values in total with respect to each of the combination weigher units 11A and 11B. Although the combination precision gained in the combination weigher units 11A and 11B in the second embodiment is slightly lower than in the first embodiment, high combination precision is gained as well in the combination weigher units 11A and 11B of the second embodiment, judging from the fact that the general combination weigher can gain satisfactory combination precision using ten measured values as described above.

In a case where the memory hopper 5 has been selected to form a combination and has discharged the objects to be weighed, and neither of the two weighing chambers 4a and 4b accommodating the objects to be weighed have been selected to form a combination, which of the two weighing chambers 4a and 4b feeds the objects to be weighed to the memory hopper 5 maybe determined in advance. In a case where the memory hopper 5 and one of the weighing chambers (e.g., 4a) have been selected to form a combination, and have discharged the objects to be weighed, and the other weighing chamber (e.g., 4b) accommodating the objects to be weighed has not been selected to form a combination, the objects to be weighed maybe fed from the other weighing chamber 4b to the memory hopper 5.

In the second embodiment, also, since the two weighing chambers 4a and 4b of the weighing hopper 4 and the memory hopper 5 are arranged substantially along the side surface of the centre base body 9, and the memory hopper 5 is disposed obliquely below the weighing hopper 4 as in the first embodiment, advantages achieved by the construction are the same as that of the first embodiment.

In the second embodiment, by performing the combination calculation with respect to each of the combination weigher units 11A and 11B under the first to fourth conditions described in the first embodiment, combination precision in the each of the combination weigher units 11A and 11B can be improved.

In the second embodiment, by setting the number of combination units in each of the combination weigher units 11A and 11B to n (e.g., n=3, 4, 5, 6, . . . ) and by setting the weight of the objects to be weighed fed from the feeding hopper 3 in every feeding to, for example, approximately 1/n of the combination target weight as in the first embodiment, substantially 100% use efficiency of the weight sensors 6 is gained, as in the first embodiment. By improving the use efficiency of the weight sensors 6 in this manner, more efficient use of the weight sensors 6, which are expensive, can be realized.

Whereas the combination weighers of the first and second embodiments are each divided into the two combination weigher units 11A and 11B, they may alternatively be divided into three or more combination weigher units. In a further alternative, they need not be divided into a plurality of combination weigher units (may operate as a single combination weigher unit).

The dispersion feeder 1, the linear feeders 2, and the feeding hoppers 3 in the combination weighers of the first and second embodiments are not intended to be limited in construction to the above. They may be constructed in other ways depending on the type of the objects to be weighed such as powder or chunks so long as feeding means capable of feeding the objects to be weighed to the two weighing chambers 4a and 4b of the weighing hopper 4 is equipped. Furthermore, the control unit 10 is not limited to being configured as the single control apparatus, but instead may be configured to include a plurality of control apparatuses which are disposed in a distributed manner so as to co-operate to control the operation of the combination weigher.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

The combination weigher of the present invention is useful as a combination which can realize efficient use of weight sensors.

The invention claimed is:

1. A combination weigher comprising:
a hopper support base body;
a plurality of weighing hoppers each of which:
is disposed around the hopper support base body,
includes two weighing chambers, and
is coupled to a corresponding weight sensor which measures weight of objects to be weighed which have been fed into the two weighing chambers of the weighing hopper, the weighing chambers each being capable of discharging the objects selectively in a first direction or in a second direction;
a plurality of memory hoppers which are disposed below the weighing hoppers to respectively correspond to the weighing hoppers, the memory hoppers each including an accommodating chamber corresponding to the two weighing chambers of the corresponding weighing hopper, the accommodating chambers being fed with the objects which have been discharged in the first direction from the corresponding weighing chamber, the accommodating chamber being capable of discharging the objects;
a plurality of feeding means which are disposed above the weighing hoppers to respectively correspond to the weighing hoppers, the feeding means being each configured to feed the objects to each of the two weighing chambers of the corresponding weighing hopper;
a collecting chute having an outlet provided below the hopper support base body, the collecting chute being configured to receive the objects which have been discharged from the weighing chamber in the second direction and the objects which have been discharged from the accommodating chamber and to discharge the objects from the outlet; and
a control means which is configured to:
obtain a measured value from each weight sensor,
perform a combination calculation based on:
measured values of the objects which have been fed into the weighing chambers of each of the weighing hoppers and a measured value of the objects which have been fed into the accommodating chamber of each of the memory hoppers, select from the weighing chambers and accommodating chambers a combination of chambers which have been fed with the objects the total measured value of which chambers falls within an allowable range with respect to a combination target weight, and cause the selected combination of chambers to discharge the objects onto the collecting chute;

wherein the two weighing chambers of each of the weighing hoppers are arranged along a side surface of the hopper support base body and the accommodating chamber of each of the memory hoppers is arranged to correspond to the two weighing chambers;

wherein each of the feeding means is configured to, when repeating the combination calculation and the discharging of the objects, feed the objects to only one of the two weighing chambers of the corresponding weighing hopper in a time period between the combination calculation and a next combination calculation;

and wherein the control means is configured to perform the combination calculation on condition that the selected combination of chambers comprises two or fewer chambers selected from each of the plurality of combination units.

2. The combination weigher according to claim 1, wherein the control means is configured to perform the combination calculation on condition that two chambers are selected simultaneously to form the combination from combination units in which all the weighing chambers and accommodating chambers have been fed with the objects.

3. The combination weigher according to claim 1, wherein the control means is configured to perform the combination calculation on condition that the number of combination units from which two chambers are selected simultaneously to form the combination is limited to one or less.

4. The combination weigher according to claim 1, wherein the control means is configured to perform the combination calculation on condition that, when the selected combination of chambers comprises three or more chambers and two of the three or more chambers are selected from an arbitrary combination unit, the remaining one or more chambers are selected from combination units in which all the chambers have been fed with the objects such that the one or more chambers are selected from different combination units.

5. The combination weigher according to claim 1, wherein a total number of the feeding means is n, a total number of the weighing hoppers is n, and a total number of the memory hoppers is n;

and wherein weight of the objects to be weighed fed from each of the feeding means to the weighing chamber of the corresponding weighing hopper in every feeding is approximately 1/n of the combination target weight.

* * * * *